(12) United States Patent
Müller

(10) Patent No.: US 6,796,508 B2
(45) Date of Patent: Sep. 28, 2004

(54) RFID-LABEL WITH AN ELEMENT FOR REGULATING THE RESONANCE FREQUENCY

(75) Inventor: Philipp Müller, Greifensee (CH)

(73) Assignee: Lucatron AG, Baar (CH)

( * ) Notice: Subject to any disclaimer, the term of this patent is extended or adjusted under 35 U.S.C. 154(b) by 0 days.

(21) Appl. No.: 10/239,793

(22) PCT Filed: Feb. 7, 2001

(86) PCT No.: PCT/CH01/00085
§ 371 (c)(1),
(2), (4) Date: Feb. 19, 2003

(87) PCT Pub. No.: WO01/73685
PCT Pub. Date: Oct. 4, 2001

(65) Prior Publication Data
US 2003/0169153 A1 Sep. 11, 2003

(30) Foreign Application Priority Data
Mar. 28, 2000 (CH) .............................. 594/2000

(51) Int. Cl.⁷ .............................................. G06K 19/06
(52) U.S. Cl. ....................................... 235/492; 235/451
(58) Field of Search ................................ 235/492, 441, 235/451, 462.13

(56) References Cited

U.S. PATENT DOCUMENTS

| | | | |
|---|---|---|---|
| 3,947,934 A | | 4/1976 | Olson |
| 4,021,705 A | * | 5/1977 | Lichtblau .................... 361/765 |
| 4,498,076 A | * | 2/1985 | Lichtblau ................. 340/572.3 |
| 5,276,431 A | * | 1/1994 | Piccoli et al. ............ 340/572.5 |
| 5,438,305 A | * | 8/1995 | Hikita et al. .................. 333/32 |
| 5,574,431 A | * | 11/1996 | McKeown et al. ....... 340/572.3 |
| 5,695,860 A | * | 12/1997 | Imaichi et al. .............. 428/209 |
| 5,708,419 A | * | 1/1998 | Isaacson et al. ......... 340/572.5 |
| 5,754,110 A | * | 5/1998 | Appalucci et al. ........ 340/572.5 |
| 5,773,880 A | * | 6/1998 | Ohno .......................... 235/380 |
| 5,812,065 A | * | 9/1998 | Schrott et al. ............ 340/10.34 |
| 6,091,607 A | * | 7/2000 | McKeown et al. .......... 361/777 |
| 6,161,761 A | * | 12/2000 | Ghaem et al. ............... 235/492 |
| 6,181,287 B1 | * | 1/2001 | Beigel ......................... 343/741 |
| 6,313,747 B2 | * | 11/2001 | Imaichi et al. ........... 340/572.5 |
| 6,357,106 B1 | * | 3/2002 | Oku et al. .................. 29/602.1 |
| 6,394,357 B1 | * | 5/2002 | Altwasser et al. .......... 235/492 |
| 6,424,029 B1 | * | 7/2002 | Giesler ....................... 235/492 |
| 6,424,263 B1 | * | 7/2002 | Lee et al. ................. 340/572.7 |
| 6,437,985 B1 | * | 8/2002 | Blanc et al. ................. 361/749 |
| 6,459,588 B1 | * | 10/2002 | Morizumi et al. .......... 361/737 |
| 6,585,165 B1 | * | 7/2003 | Kuroda et al. .............. 235/492 |
| 6,666,380 B1 | * | 12/2003 | Suzuya ....................... 235/492 |

FOREIGN PATENT DOCUMENTS

| | | |
|---|---|---|
| EP | 0 821 406 A2 A3 | 1/1998 |
| WO | WO 89/05984 | 6/1989 |
| WO | WO 99/48071 | 9/1999 |
| WO | WO 00/03354 | 1/2000 |

* cited by examiner

Primary Examiner—Michael G. Lee
Assistant Examiner—Uyen-Chau N. Le
(74) Attorney, Agent, or Firm—Morgan, Lewis & Bockius, LLP

(57) ABSTRACT

An RFID label comprises a resonant circuit consisting of a coil and a capacitor. The RFID label is provided with an additional element (13, 17, 20, 21) for regulating the resonance frequency of the resonant circuit. The additional element is applied to the surface of the RFID label after production of the same. The additional element can be especially a sticker with a conductive layer, which is stuck in such a way that it partially overlaps individual conductive surfaces of the label to produce an additional capacitance, or which is simply stuck into the coil to reduce the effective inductance of the coil. Alternatively, the element can be formed by a layer with a high relative permittivity which is applied between two conductive surfaces.

19 Claims, 3 Drawing Sheets

RFID-LABEL WITH AN ELEMENT FOR REGULATING THE RESONANCE FREQUENCY

TECHNICAL AREA

This invention relates to an RFID label in accordance with the first part of claim 1. The abbreviation "RFID" stands for the English expression "Radio Frequency Identification".

RFID labels comprise, like the ones considered here, an electrical resonant circuit with a coil and a capacitor generally on a thin plastic substrate as well as a very small integrated semiconductor circuit (chip) which gives the label a certain intelligence. The coil also acts as an antenna so that the label can communicate by "radio" as it were with a remote transmitting and receiving station on the resonant frequency determined by its resonant circuit in the "radio wave" range. The label draws the energy needed to operate the semiconductor circuit from the external field received via the coil antenna. The label itself therefore has no energy source of its own.

RFID labels can be used in particular, due to their "intelligence", for the identification of articles, at the entrance to a building complex to provide secure access, or also, for example, as a ski-lift ticket.

As a rule, RFID labels are subject, along with their pertinent transmitting and receiving stations, to strict technical regulations which, for example, allow only very strictly limited frequency bands for their operation. Such a frequency band often chosen for RFID labels is, for example, 13,560 MHz, with the width of this band being only ±7 KHz.

With respect to RFID labels of the design described, there is now the problem of the precise regulation and maintenance of the resonant frequency of the labels in such a narrow range, especially in the case of large-scale production.

PRIOR ART

Such a device is known from the prior art in various configurations.

Different methods for "trimming" the resonant frequency have already been disclosed for secondary correction of a resonant frequency that is not in the desired frequency range.

Such a known trimming procedure is, for example, the cutting down of a capacitor by means of a laser (see U.S. Pat. No. 3,947,934) or a blanking or cutting tool (see WO 89/05984). This makes the area of the capacitor smaller, which reduces its capacitance. The resonant frequency of the resonant circuit is affected by the reduction in capacitance. i.e. the resonant frequency is increased.

Another known technique is the melting of the plastic film between the capacitor surfaces. This reduces the distance between the plates of the capacitor, which causes the capacitance of the capacitor to be increased and thus causes a reduction in the resonant frequency of the resonant circuit.

Both of these known techniques have various disadvantages. For example, they require the use of expensive precision machines which make the production process for such labels much more expensive. There is also the danger of damaging the surfaces when the capacitor plates are cut to size on the film. Additionally, the known techniques cannot be readily implemented at the required speed during the mass production of labels using the continuous operation process.

PRESENTATION OF THE INVENTION

It is therefore the object of this invention to indicate how the resonant frequency of RFID labels can also be regulated so that they are then in a given frequency band. This also has to be mechanically simpler and therefore more economical than with the known techniques.

This object is achieved by providing the label with an additional element subsequently applied to its surface which changes the resonant frequency of the resonant circuit and brings it into the desired range.

The advantages of this invention can be seen especially in the fact that a sticker with a conductive layer or a layer made of a material with a high dielectric constant can be used as the additional element, the area and/or material of which cause the desired correction of the resonant frequency and which can be very simply and precisely applied, even in large-scale production, and at a high production rate to the otherwise already finished label.

Also, in the method of this invention, the extent of the frequency change caused by the additional element can be chosen to be absolutely larger than with the known trimming procedure mentioned above, which increases the precision of the frequency regulation that can be achieved.

According to a preferred embodiment, a sticker with a conductive layer and an adhesive layer is applied for the purpose of increasing the effective capacitance of the resonant circuit and overlaps, at least partially, at least two conductive surfaces with different potentials on the same side of the substrate. It can be applied on the same side of the substrate as these conductive surfaces, directly on them as it were, with, for example, only the adhesive layer acting both as an insulating and a dielectric layer. On the other hand, however, it can also be applied on the opposite side of the substrate, with the substrate additionally acting both as an insulator and a dielectric. The sticker is particularly effective if the areas selected as the conductive surfaces to which it is applied are at least approximately at the potential of the two plates of the capacitor. Normally these are those areas that are also used for bonding the semiconductor circuit.

Basically, a sticker could also be conductively connected with a conductive surface on one side of the substrate and also be arranged in such a way that it at least partly overlaps another conductive surface on the opposite side of the substrate. This also results in increased capacitance, assuming that the corresponding conductive surfaces are not at the same electrical potential.

In another preferred embodiment, a sticker with a conductive layer is applied in the area within the coil so as to reduce the effective inductance of the resonant circuit. This influences the magnetic field inside the coil so that inductance is reduced, which produces a desired frequency increase. This measure is particularly effective if the sticker is positioned away from the center of the coil since the magnetic flux is denser here than in the center.

Instead of, or in addition to, a sticker, a local layer consisting of an initially liquid or pastelike and later drying or hardening material with a high dielectric constant can be used as an additional element according to the invention, with the local layer of this material being placed in the gap between two conductive surfaces with a different electrical potential. A layer of this type creates an additional dielectric between the conductors, which results in increased capacitance and hence a decrease in the frequency of the resonant circuit. The paste is easily applied between the two conductors. The dielectric of the paste can also be adjusted depending on the desired frequency adjustment.

Other embodiments follow from the dependent claims and from the following description of examples of embodiment.

BRIEF EXPLANATION OF THE FIGURES

The invention is illustrated in more detail by the following examples of embodiment connected with the diagram. The following are shown.

WAYS OF EMBODYING THE INVENTION

Figure 1:
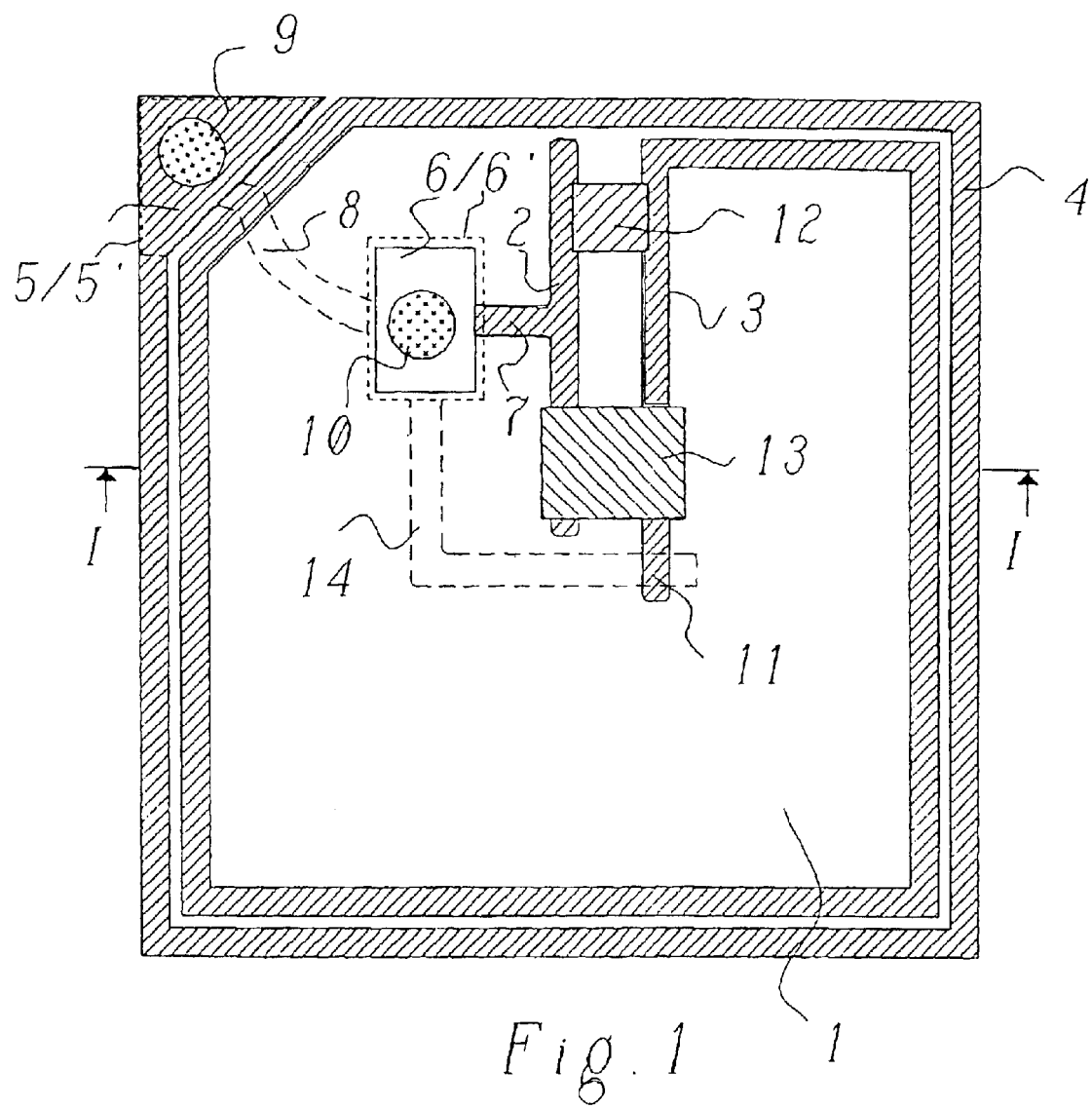
FIG. 1 A plan view of an RFID label with an additionally applied sticker.

In FIG. 1, 1 designates a plastic film which is made, for example, of polyester and is provided on both sides with conductive surfaces, preferably made of aluminum. From the conductive surfaces, two parallel strip conductors 2 and 3, a coil 4, a first corner surface 5, a first contact surface 6 and a connecting piece 7 are arranged on the front side of the substrate. The dotted lines of strip conductors 8 and 9 are, on the other hand, arranged on the back side of the substrate. On the back side of the substrate, there is also a second corner surface 5' essentially coincident with first corner surface 5, and a second contact surface 6' essentially coincident with first contact surface 6. Between first corner surface 5 and second corner surface 5', there is a first through-contact 9 formed by means of so-called crimping. There is also another such through-contact 10 between the two contact surfaces 6 and 6'.

The end of coil 4 is connected to strip conductor 3 and opens at its other end into first corner surface 5. From there the electrical connection continues via through-contact 9 to second corner surface 5', via strip conductor 8 to the other contact surface 6' and from there to strip conductor 14. In the area of their free ends, strip conductors 3 and 14 cross over on different sides of the substrate and there form the plates of capacitor 11. This again forms a resonant circuit with coil 4.

Strip conductor 14 is located on the back side of the substrate and, hence, the rear plate of the capacitor is connected via through-contact 10 and connecting piece 7 with strip conductor 2 located on the front side of the substrate, imparting to it the potential of the rear plate of the capacitor. On the other hand, strip conductor 3 has the potential of the front plate of the capacitor. A semiconductor circuit or chip 12 is connected to the two strip conductors 2 and 3 and therefore driven by the voltage of capacitor 11.

The RFID label shown in FIG. 1 is also trimmed, i.e., by sticker 13 which is stuck to partly overlap surfaces 2 and 3. Surfaces 2 and 3 are designed to be sufficiently extra long for this purpose. Sticker 13 has a conductive layer 15, made of aluminum for example, provided with an adhesive layer 16 (see FIG. 3A or 3B) and causes locally, depending on the size of the conductive layer and its overlap of conductive surfaces 2 and 3 of the label, an additional capacitance which increases the capacitance of the resonant circuit. This again results in decreasing the frequency of resonant circuit 1.

The trimming of the resonant circuit with sticker 13 can basically take place after the label as such is produced, with the actual frequency of the resonant circuit first being determined, for example, by frequency measuring cells. The actual frequency is then compared with a preset nominal frequency and a correction factor is derived. This correction factor is used to select the size of sticker 13.

Sticker 13 can either be placed directly on the two conductive surfaces 2 or 3, with only its adhesive layer acting as insulation against these surfaces and as a dielectric, or it can be placed on the opposite side of the substrate, with the substrate also acting as an insulator and forming a dielectric.

Figure 2:
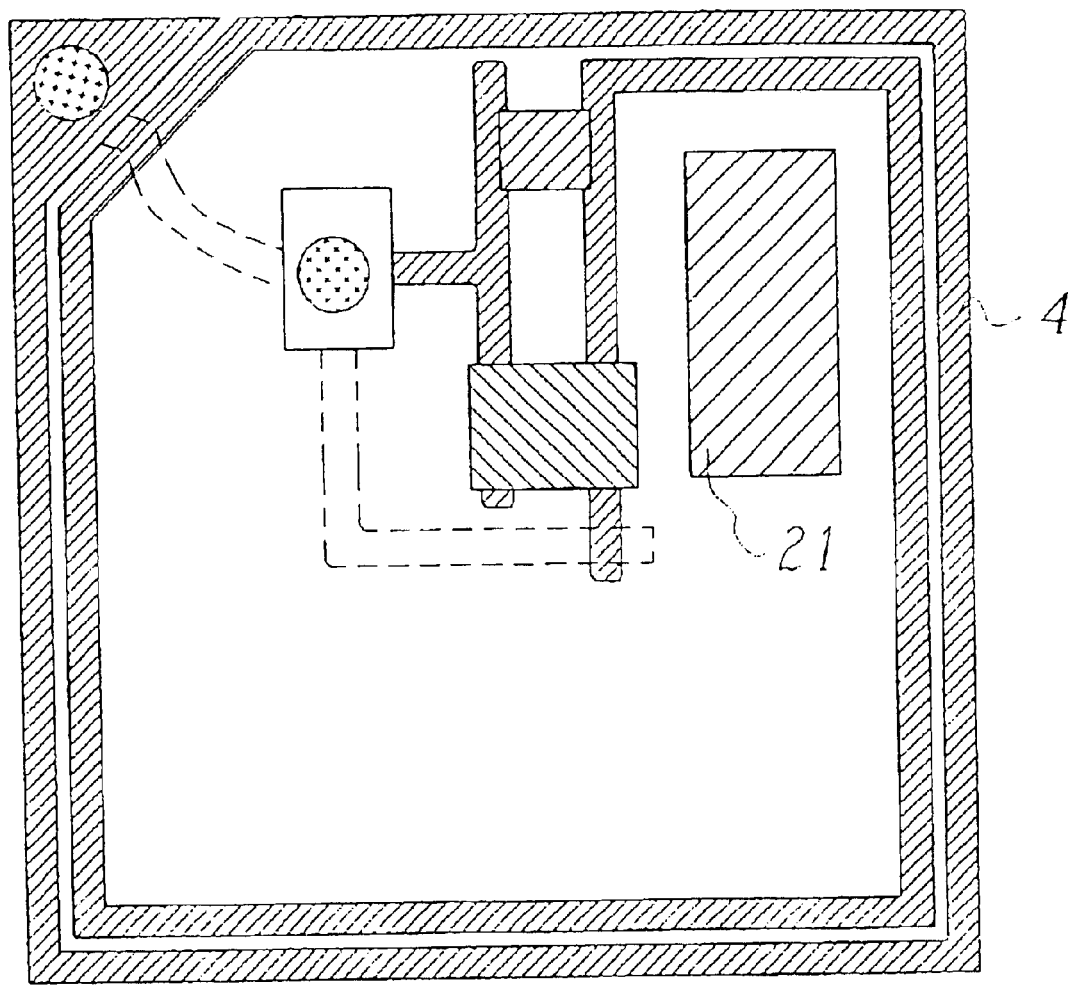
FIG. 2 A plan view of an RFID label with a sticker inside the coil.

FIG. 2 shows another possible method of regulating the frequency of resonant circuit 1. Sticker 21 with a conductive layer, again consisting for example of aluminum, is here simply applied with no overlapping of any of the conductive surfaces anywhere on a free surface inside coil 4. The magnetic field inside coil 4 is changed by sticker 21. More exactly, inductance L of the coil is reduced by sticker 21. This acts to increase the resonant frequency of resonant circuit 1. Sticker 21 is best positioned away from the center of the coil since its effect on the magnetic flux is greater in that position than in the center of coil 4.

Figure 3:
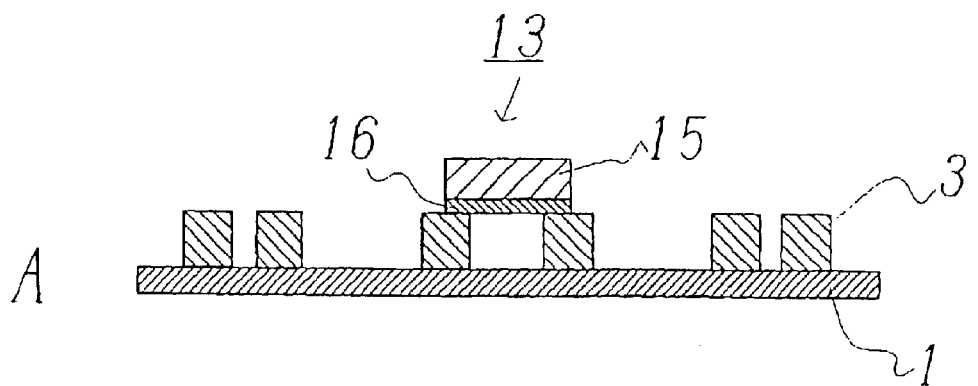
FIG. 3 Different sectional views (A through C) of possible sticker applications.
Figure 3:
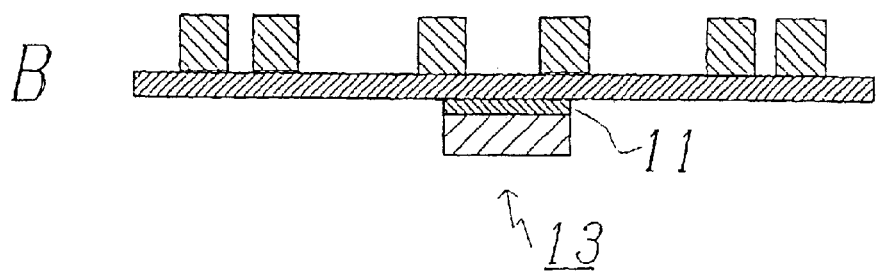
Figure 3:
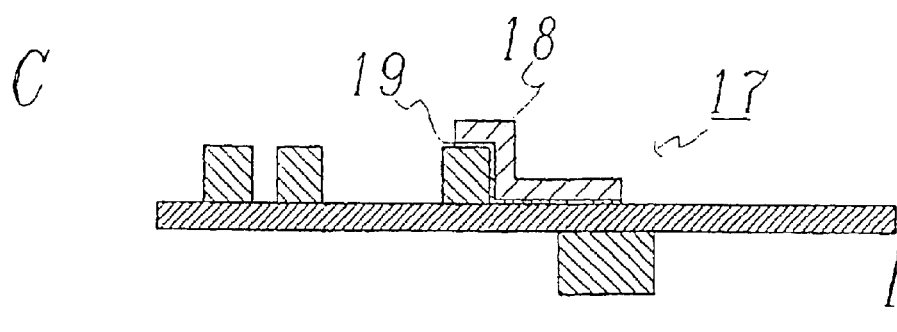

FIG. 3 shows a sectional view of the two possibilities (A and B) already described for placing sticker 13 in a capacitance-increasing position that at least partly overlaps two strip conductors 2 and 3, with A corresponding to section 1—1 of FIG. 1 and showing sticker 13 on the front side of the substrate, i.e., on the same side as the two strip conductors 2 and 3. The conductive layer of sticker 13 is designated as 15 and its adhesive insulating layer as 16. B shows sticker 13 on the back side of the substrate, opposite strip conductors 2 and 3. Since the substrate also acts as an insulator here, sticker 13 could also be applied directly into plastic film 1 without adhesive layer 16, by heat-sealing for example.

In sectional view C, sticker 17 with conductive layer 18 and adhesive conductive layer 19 overlaps at least partly a first conductive surface conductively and another conductive surface that is laid out on the opposite side of the substrate and is at a different potential than the first surface. It is clear that here too sticker 17 causes an additional capacitance between the two conductive surfaces shown.

Figure 4:
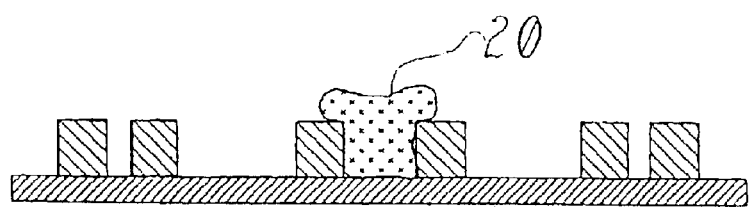
FIG. 4 Sectional view of an alternative solution with an additionally applied local layer consisting of a material with a high dielectric constant.

In FIG. 4, a local layer 20 is shown between two conductive surfaces with a different potential on the same side of the substrate. Local layer 20 is produced from, for example, a liquidly applied material with a high dielectric constant $\epsilon$, preferably in the range of $\epsilon_r$ 2–10, with this material later solidifying and/or drying and/or hardening. Due to the high dielectric constant, like the sticker described above, the layer causes a local capacitance increase between the two strip conductors, which increases the total capacitance of the resonant circuit and thereby lowers its resonant frequency. It is clear that the extent of the change in capacitance is here determined above all by the length of layer 20 along the two strip conductors.

As far as the change in capacitance is concerned, this also basically depends on the position chosen for the sticker or the local layer. It is greatest if the conductive surfaces which the sticker at least partly overlaps or between which the layer is placed, are at a potential that is as different as possible. In the case of an RFID label of the kind considered here, the greatest potential difference is developed between the plates of resonant circuit capacitor 11. For this reason, sticker 13 is also applied diagonally over the two strip conductors 2 and 3 which have this maximum potential.

On the other hand, it may also be advantageous to apply a sticker or layer in the area of the label on which it is less effective, such as, for example, anywhere between two coil windings, and to make the sticker or layer larger or longer to compensate for this. In this way, desired frequency trimming can, if necessary, be achieved even more precisely and by "cruder" means. The same considerations are also a factor in deciding which side of the substrate the sticker should best be placed on.

KEY TO DIAGRAMS

1 Plastic film
2 Strip conductor
3 Strip conductor
4 Coil
5 First corner surface
5' Second corner surface
6 Contact surface
6' Contact surface
7 Connecting piece
8 Strip conductor
9 Through-contact
10 Through-contact
11 Capacitor
12 Chip
13 Sticker
14 Strip conductor
15 Conductive layer
16 Insulating layer
17 Sticker
18 Conductive layer
19 Adhesive conductive layer
20 Local layer
21 Sticker

What is claimed is:

1. RFID label for identification of an article comprising a substrate made of a plastic film and conductive surfaces on the front and the back side of the substrate, the conductive surfaces forming, a plurality of electrical components including an electrical resonant circuit which comprises a coil with at least one coil winding and a capacitor with a first capacitor plate on the front side of the substrate and a second capacitor plate on the back side of the substrate with a first conductive surface being arranged on the front side of the substrate conductively connected with the second plate of the capacitor on the back side of the substrate, wherein the RFID label further comprises an integrated semiconductor circuit in the form of a miniature chip, electrical terminals of which being connected, on one side, to the first conductive surface and, on another side, to a conductive surface that is essentially at the same electrical potential as the first plate of the capacitor, thereby the miniature chip being driven by a voltage of the capacitor, and an additional element other than the article subsequently applied to a surface of the RFID label which changes the a resonant frequency of the resonant circuit.

2. The RFID label according to claim 1, wherein the additional element includes a sticker with a metallic conductive layer.

3. The RFID label according to claim 2, characterized in that the sticker is applied to at least partly overlap at least two conductive surfaces arranged next to each other on the same side of the substrate, for increasing an effective capacitance of the resonant circuit.

4. The RFID label according to one of claim 2 or 3, characterized in that the sticker is arranged to at least partly overlap the first conductive surface as well as one conductive surface which is essentially at the same electrical potential as the first plate of the capacitor, for increasing an effective capacitance of the resonant circuit.

5. The RFID label according to claim 3, characterized in that the sticker is applied to the same side of the substrate as the conductive surfaces with which the sticker acts jointly with an adhesive insulating layer directly on these conductive surfaces.

6. The REID label according to any one of claims 2 and 3, characterized in that the sticker is applied at least partly in an area inside the coil for reducing an effective inductance of the resonant circuit.

7. The RFID label according to claim 6, characterized in that the area inside the coil (4) has a center and that the sticker is applied away from this center.

8. The RFID label according to any one of claims 1–3, further comprising a local layer of a material having a high dielectric constant, the local layer bridging a gap between two conductive surfaces of a different electrical potential on the same side of the substrate.

9. The REID label according to claim 8, characterized in that the material can be applied in a liquid or paste state and subsequently solidifies and/or dries and/or hardens.

10. The REID label according to claim 8, characterized in that the local layer bridges a gap between the first conductive surface as well as a conductive surface that is essentially at the same electrical potential as the first plate of the capacitor.

11. The RFID label according of claim 8, wherein the dielectric constant is in the range between $\epsilon_r$ 2 and 10.

12. The REID label according to claim 3, characterized in that the sticker is applied to the opposite side of the substrate to the conductive surfaces with which the sticker acts jointly.

13. The RFID label according to claim 3, characterized in that the sticker is conductively connected to a conductive surface on one side of the substrate and the sticker is also arranged at least partly overlapping another conductive surface of a different potential on the opposite side of the substrate.

14. The RFID label according to claim 2, wherein the sticker is made of aluminum.

15. The REID label according to claim 1, wherein the additional element is applied to one of the conductive surfaces on the front or back side of the substrate.

16. The REID label according to claim 1, wherein the additional element is applied on a free surface inside the coil and the additional element does not overlap with any of the conductive surfaces.

17. The RFID label according claim 1, wherein a size of the additional element is smaller than a size of the RFID label.

18. The REID label for identification of an article comprising:
a substrate made of a plastic film; and
conductive surfaces on the front and the back side of the substrate,
wherein the conductive surfaces form a plurality of electrical components including:
an electrical resonant circuit which comprises a coil with at least one coil winding;
a capacitor with a first capacitor plate on the front side of the substrate and a second capacitor plate on the back side of the substrate;
a first conductive surface being arranged on the front side of the substrate conductively connected with the second plate of the capacitor on the back side of the substrate; and
a sticker subsequently applied to one of the conductive surfaces on the front or back side of the substrate which changes a resonant frequency of the resonant circuit, characterized in that the sticker is applied to the opposite side of the substrate to the conductive surfaces with which the sticker acts jointly.

19. The REID label for identification of an article comprising:
   a substrate made of a plastic film; and
   conductive surfaces on the front and the back side of the substrate,
   wherein the conductive surfaces form a plurality of electrical components including:
      an electrical resonant circuit which comprises a coil with at least one coil winding;
      a capacitor with a first capacitor plate on the front side of the substrate and a second capacitor plate on the back side of the substrate:
      a first conductive surface being arranged on the front side of the substrate conductively connected with the second plate of the capacitor on the back side of the substrate; and
      a sticker subsequently applied to one of the conductive surfaces on the front or back side of the substrate which changes a resonant frequency of the resonant circuit,
   characterized in that the sticker is conductively connected to a conductive surface on one side of the substrate and the sticker is also arranged at least partly overlapping another conductive surface of a different potential on the opposite side of the substrate.

* * * * *